US007991838B2

(12) United States Patent
Bolf et al.

(10) Patent No.: US 7,991,838 B2
(45) Date of Patent: Aug. 2, 2011

(54) APPARATUS AND METHOD FOR REPORT SHARING WITHIN AN INSTANT MESSAGING FRAMEWORK

(75) Inventors: Didier Marc Jean Bolf, Boulogne-Billancourt (FR); Patrick Yee Cheuk Cheng, Vancouver (CA); Alexis-Jean Laurent Naïbo, Lavallois-Perret (FR); Hlaing Than, Richmond (CA); Ju Wu, Coquitlam (CA)

(73) Assignee: Business Objects Software Ltd., Dublin (IE)

( * ) Notice: Subject to any disclaimer, the term of this patent is extended or adjusted under 35 U.S.C. 154(b) by 948 days.

(21) Appl. No.: 11/488,459

(22) Filed: Jul. 17, 2006

(65) Prior Publication Data
US 2007/0266104 A1    Nov. 15, 2007

Related U.S. Application Data

(63) Continuation-in-part of application No. 11/394,641, filed on Mar. 31, 2006.

(51) Int. Cl.
*G06F 15/16* (2006.01)
(52) U.S. Cl. .................... 709/204; 709/206; 709/219
(58) Field of Classification Search .................. 709/204, 709/205, 206
See application file for complete search history.

(56) References Cited

U.S. PATENT DOCUMENTS

| 7,149,776 | B1 | 12/2006 | Roy et al. |
| 7,370,269 | B1 | 5/2008 | Prabhu et al. |
| 7,543,237 | B2 | 6/2009 | Kontny et al. |
| 2004/0054802 | A1* | 3/2004 | Beauchamp et al. ......... 709/225 |
| 2004/0215610 | A1* | 10/2004 | Dixon et al. ...................... 707/3 |
| 2004/0252134 | A1 | 12/2004 | Bhatt et al. |
| 2005/0188016 | A1 | 8/2005 | Vdaygiri et al. |
| 2006/0010197 | A1 | 1/2006 | Ovenden |
| 2006/0026145 | A1 | 2/2006 | Beringer et al. |
| 2006/0026231 | A1 | 2/2006 | Degenhardt et al. |
| 2006/0026235 | A1 | 2/2006 | Schwarz et al. |
| 2006/0041844 | A1 | 2/2006 | Homiller |

FOREIGN PATENT DOCUMENTS

| EP | 1075119 | 2/2001 |
| JP | 2005250947 | 9/2005 |

* cited by examiner

*Primary Examiner* — Patrice Winder
(74) *Attorney, Agent, or Firm* — Mintz, Levin, Cohn, Ferris, Glovsky and Popeo, P.C.

(57) ABSTRACT

A computer implemented method includes sending to a report server a first request for report content initiated by a first user. The report content is served to the first user. The report content is displayed to the first user. A second request from the first user is sent to the report server to share the report content with a second user. That the second user has permission to view the report content is confirmed. The report content is served and displayed to the second user.

11 Claims, 10 Drawing Sheets

APPARATUS AND METHOD FOR REPORT SHARING WITHIN AN INSTANT MESSAGING FRAMEWORK

CROSS REFERENCE TO RELATED APPLICATIONS

This application is a continuation-in-part of the pending U.S. patent application entitled "Apparatus and Method for Report Sharing within an Instant Messaging Framework", Ser. No. 11/394,641, filed Mar. 31, 2006, which is incorporated herein by reference. This application is related to the following concurrently filed, commonly owned U.S. patent application entitled "Apparatus and Method for Supplying Report Content within Collaborative Frameworks", Ser. No. 11/488,463, filed Jul. 17, 2006, which is incorporated herein by reference.

BRIEF DESCRIPTION OF THE INVENTION

This invention relates generally to reporting and instant messaging. More particularly, this invention relates to sharing a report document in an interactive manner.

BACKGROUND OF THE INVENTION

Instant messaging refers to real time communication between two or more people over a network, such as the Internet. A user requires a client program and a connection to an instant messaging service. Usually the instant messaging service is administered by an instant messenger server. The composition and function of these servers are well known in the art. Once connected to an instant messaging service, users can send messages, including text and graphics, in real time. The activity is often referred to as "chatting". A conversation can be held with two or more people on the same computer, network, or across the Internet.

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

The desire to share documents is frequently inconsistent with the need to keep the information in the documents secret. Commonly, two different users have different permission sets to view and change data.

To date, instant messaging, business intelligence, and particularly report generation techniques, have operated in different domains. It would be desirable to provide techniques to integrate these separate domains.

SUMMARY OF INVENTION

The invention includes a computer implemented method. A first request for report content initiated by a first user is sent to a report server. The report content is served to the first user. The report content is displayed to the first user. A second request from the first user is sent to the report server to share the report content with a second user. That the second user has permission to view the report content is confirmed. The report content is served and displayed to the second user.

The invention also includes a computer readable medium storing executable instructions to facilitate an instant messaging conversation between a first computer and a second computer on a network. A first request for a report specified by a first user of the first computer is processed. A first portion of the report is returned to the first computer. A second request to share the first portion of the report with a second user of the second computer is received. It is confirmed that the second user has permission to view the first portion of the report. The first portion of the report is served to the second computer.

The invention also includes a computer readable medium storing executable instructions to support at a first computer an instant messaging conversation with a second computer. Report content is displayed on the first computer. A request from the first computer to share the report content with a second computer is initiated. The first computer processes a command to grant access to the report content at the second computer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
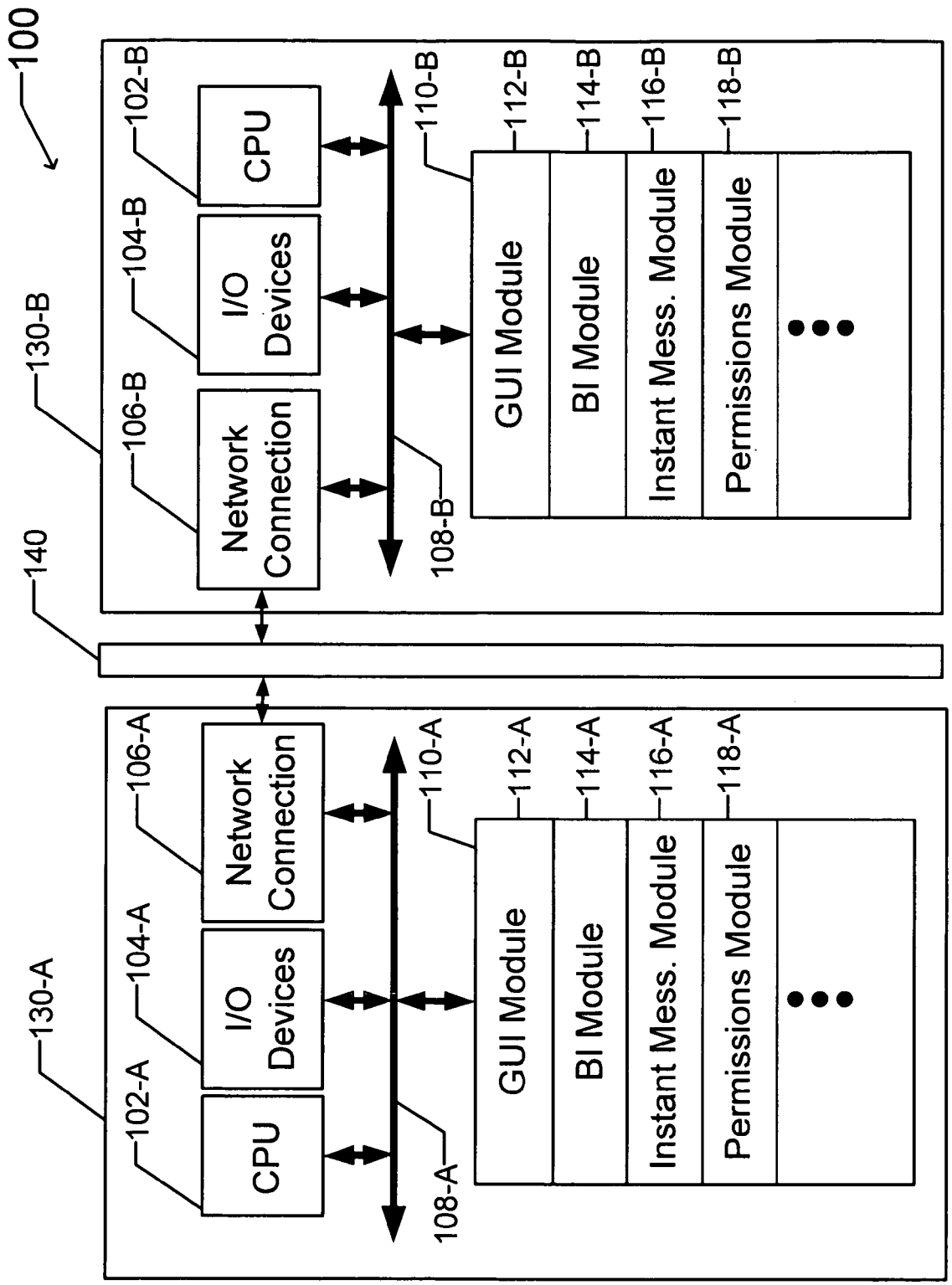
FIG. 1 illustrates a system 100 configured in accordance with an embodiment of the invention.

FIG. 1 illustrates a system 100 configured in accordance with an embodiment of the invention. The system 100 includes one or more coupled computers, e.g., arranged in a peer-to-peer architecture. The system 100 includes a first computer 130-A and a second computer 130-B. A data signal can be sent from the first computer to the second computer and vice versa via communication channel 140, which may be any wired or wireless channel.

Each computer 130 includes a central processing unit 102 connected to a set of input/output devices 104 and a network connection circuit 106 via a bus 108. As shown in FIG. 1, computer 130-A includes a CPU 102-A, input/output devices 104-A, a network connection circuit 106-A, and a bus 108-A, while computer 130-B includes a CPU 102-B, input/output devices 104-B, a network connection circuit 106-B, and a bus 108-B. For the purpose of simplicity, individual components, e.g., 102-A and 102-B, are collectively referenced only by their number, e.g., 102.

The input/output devices 104 may include standard components, such as a keyboard, mouse, display, printer, and the like. The network connection circuit 106 provides connectivity to communication channel 140.

Also connected to the bus 108 is a memory 110. The memory 110 stores executable instructions to implement operations of the invention. In an embodiment, the memory 110 stores one or more of the following modules: a graphical user interface (GUI) module 112, a BI module 114, an instant messaging module 116, and a permission module 118.

The GUI module 112 may rely upon standard techniques to produce graphical components of a user interface, e.g., windows, icons, buttons, menus and the like, examples of which are discussed below. The user interface may include instructions to receive input from a pointer device and display a cursor on an output device.

The BI module 114 includes executable instructions to perform BI related functions on computers 130-A or 130-B, across network 140 or a wider network. BI related functions include: generating reports (locally or on a server), viewing a report, performing query and analysis, and the like. In an embodiment, the BI module 114 can include sub-modules, such as a report module, a server communications module, and the like.

The instant messaging module 116 includes executable instructions to facilitate participation in an instant messaging conversation between two or more parties across network 140 or a wider network. The permissions module 118 includes executable instructions to implement functions for viewing reports which have restrictions as to which users can view them. The permissions module 118 includes executable instructions to inform a report server or other networked component of the permissions set for a particular user. In an embodiment, permissions module 118 includes executable instructions to receive messages about permissions from another user or a server. For example, another user may grant a user temporary access permissions. Alternatively, a server may inform a user that access to a report has been denied.

The modules stored in memory 110 are exemplary. Additional modules such as an operating system can be included. It should be appreciated that the functions of the presented modules may be combined. In addition, a function of a module need not be performed on a single machine, e.g., the first computer or the second computer. Instead, the function may be distributed across system 100 or a wider network, if desired. In an embodiment of the present invention, the system 100 may operate in a non-peer-to-peer architecture.

Figure 2:
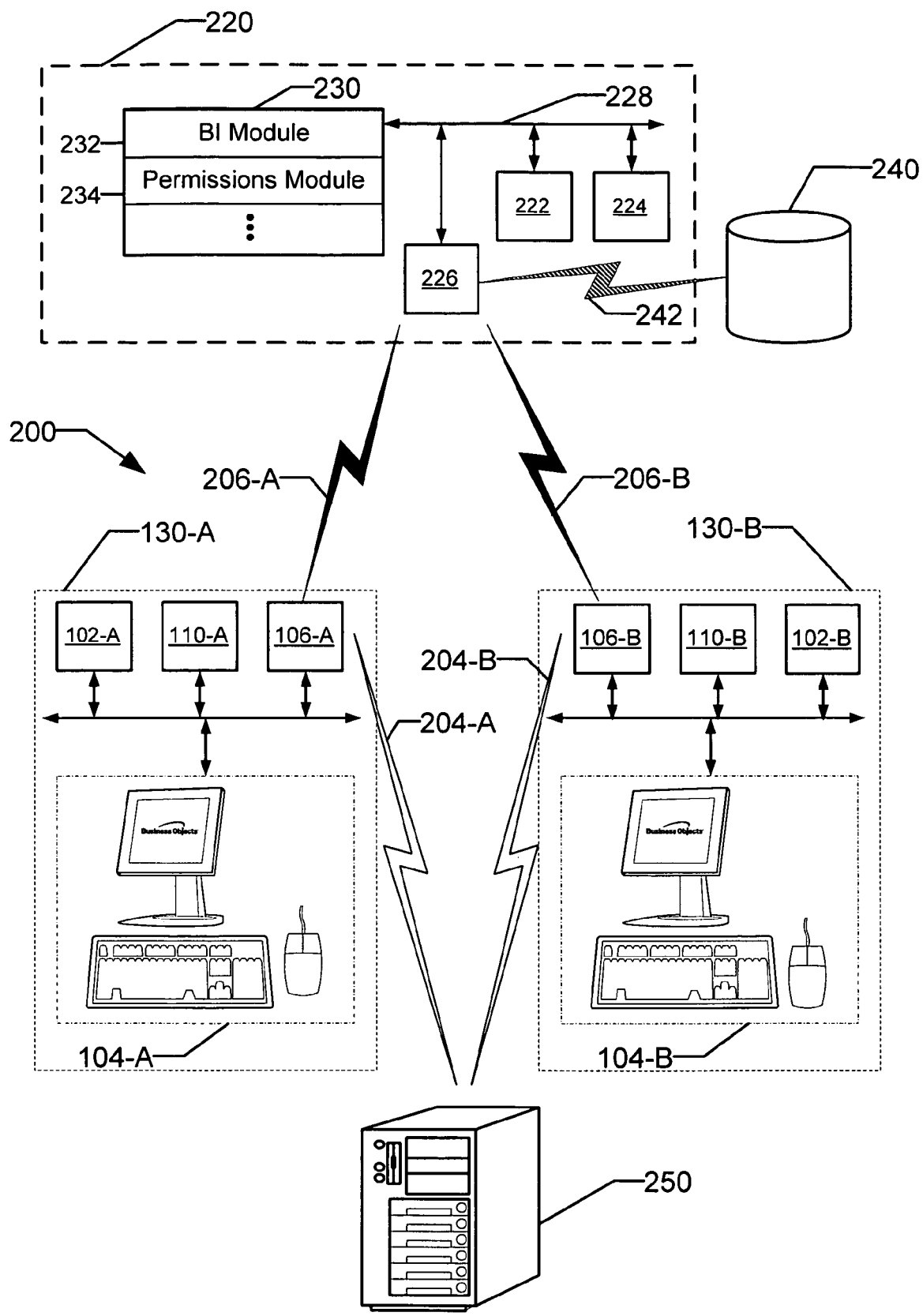
FIG. 2 illustrates a network architecture configured in accordance with an embodiment of the invention.

FIG. 2 illustrates a network architecture 200 in accordance with an embodiment of the invention. Computers 130-A and 130-B of FIG. 1 are coupled by sets of data signals 204-A and 204-B via instant messaging server 250. These computers are also coupled by sets of data signals 206-A and 206-B to a report server 220. The data signals may be carried by any wired or wireless infrastructure. In an embodiment, the data signals are encrypted and the servers 220 and 250 are placed behind firewalls.

The input/output devices 104 of computers 130-A and 130-B can include input devices such as a keyboard, mouse, and monitor. In addition, input/output devices 104 may include input/output devices such as handwriting recognition tablets, touch screen displays, scanners, printers, and the like. In an embodiment, either of computers 130-A and 130-B could be replaced by a smaller computing device, such as, a handheld computer. In an embodiment, the role of the report server 220 and instant messaging server 250, and (optionally) one of the computers 130-A or 130-B can be combined.

The report server 220 includes standard computing components for storing and processing of reports. In an embodiment, the server includes a central processing unit 222 connected to a set of input/output devices 224 and a network connection circuit 226 all coupled via a bus 228. The report server 220 can be coupled to a data store 240 via a set of data signals 242. Also connected to the bus 228 is a memory 230. The memory 230 stores executable instructions to implement operations of the invention. In an embodiment, the memory 230 may store a BI module 232 and a permissions module 234. As with memory 110, the modules stored in memory 230 are exemplary The BI module 232 includes executable instructions to perform BI related functions on the report server 220. These functions could be for computers 130-A or 130-B. BI related functions may include generating reports (locally or on a server), viewing a report, performing query and analysis, and the like. In an embodiment, the BI module 232 includes a report sub-module, a searching sub-module, and the like. The search sub-module includes executable instructions to implement functions for searching reports. The search sub-module includes executable instructions to implement functions for searching over a plurality of reports and within a report.

The permission module 234 includes executable instructions to implement serving up reports which have restrictions as to which users can view them. The permissions module 234 includes executable instructions to advise a user, or a computer 130 executing a local permission module 118, whether the user can view a report. In an embodiment, permissions module 234 includes executable instructions to grant a user access to a report.

The server 250 includes standard computing components and executable instructions to host a collaborative working environment. In one embodiment, the server 250 includes executable instructions to host an instant messaging conversation between a plurality of users. Such computing components and executable instructions are well known in the art.

Figure 3:
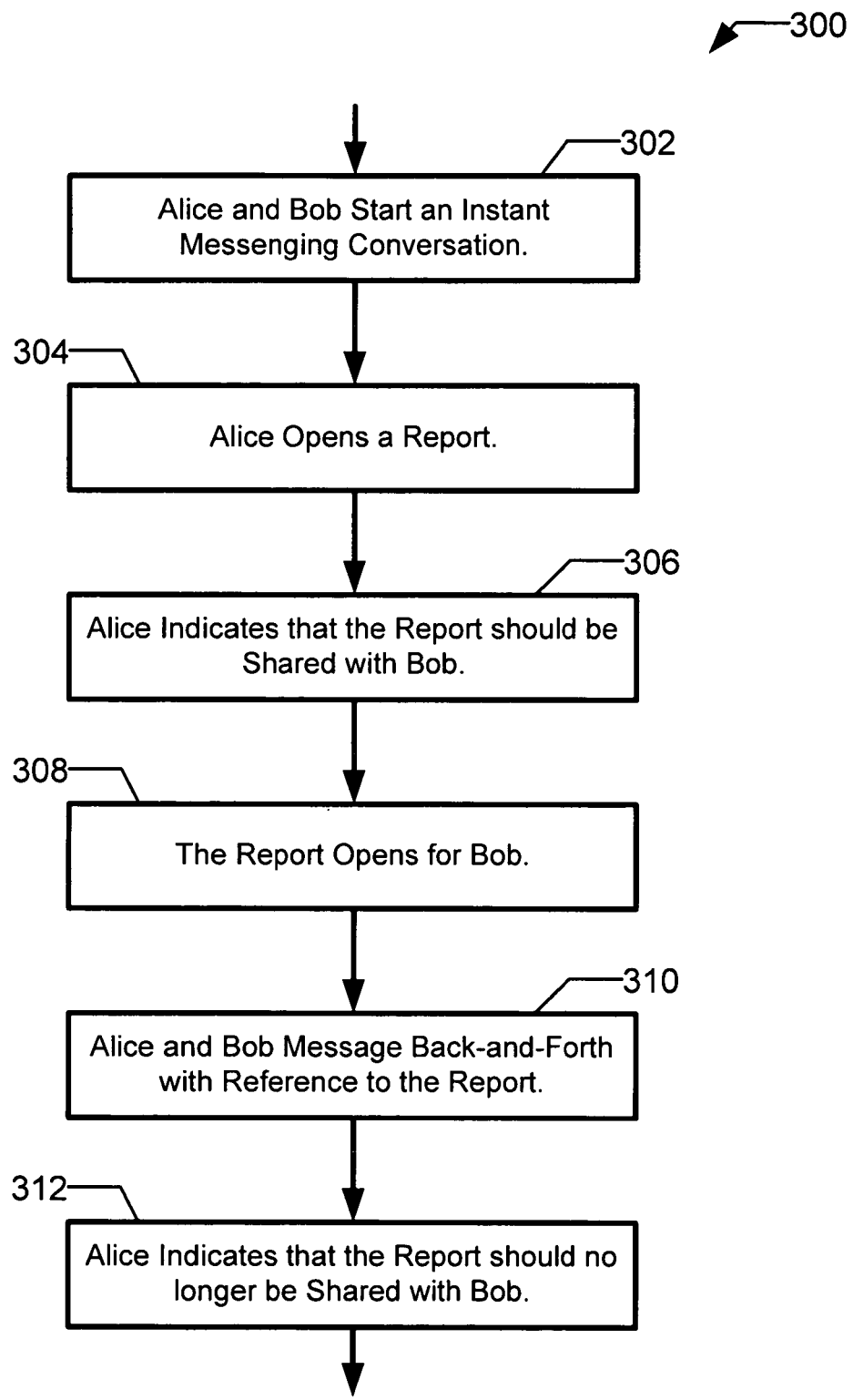
FIG. 3 illustrates a workflow associated with an embodiment of the invention.

FIG. 3 illustrates a workflow for sharing a report document within an instant messaging framework. In the first processing operation of FIG. 3, a plurality of users start an instant messaging conversation 302. For the purposes of illustration, the plurality of users can be replaced, without limitation, by two users, personified herein, as "Alice" and "Bob" representing user A and user B.

In processing operation 304, Alice opens a report such that it is displayed on an output device 104-A of her computer 130-A. Optionally, Alice can manipulate the report (e.g., refresh, specify a parameter) or change the view of the report (e.g., page down, drill down, click through to a sub-report).

Alice directs that the report be displayed for Bob 306. For example, Alice clicks a "Start Sharing" button or menu item in her user interface. In operation 308, The report opens for Bob such that it is displayed on an output device 104-B of his computer 130-B. The report is already open for Alice. Alternative methods of opening and sharing a report document are described in U.S. patent application entitled "Apparatus and Method for Report Sharing within an Instant Messaging Framework", Ser. No. 11/394,641, filed Mar. 31, 2006.

Permissions can be extended from Alice to Bob. At least one permissions module (e.g., 118-B or 234) specifies baseline access permissions for Bob. In an embodiment, Alice, based upon her own set of permissions, is allowed to temporarily override the baseline access permissions and grant Bob access to additional information. In an embodiment, Alice can extend permissions to Bob that are equal to or less than her own permissions. These permissions can be extended in the form of a token transferred from permissions module 118-A on Alice's computer to permissions modules 118-B or 234. The override can be limited in scope, duration, action, location, or the like. Examples of limitations of scope include limiting which reports and which data Bob has permissions to access. Bob's permissible actions can include one or more of read, write, save, export, print or the like. In an embodiment, a token exists for a specified period of time. The token can be limited to a given computer identified by an IP address, a MAC address, and the like.

In operation 310, Alice and Bob exchange message back-and-forth with reference to the report. They are sharing between them and consuming the report together. In an embodiment, Bob's access to the report, including viewing and interacting, is modulated by Alice and permissions modules 118-B and 234.

Alice, having shared her view of the report with Bob, can stop sharing at any time. In an embodiment, when Alice stops sharing a report with Bob, a signal is sent from computer 130-A to 130-B, revoking Bob's override permissions, thereby disabling Bob's access to additional information beyond his baseline access permissions. In an embodiment, a signal is sent from Alice's computer to Bob's computer specifying that Bob's current view of a report is to be erased. Alice can then change her view of the report and again indicate that the report should be shared with Bob. She may want to do this because she does not want Bob to see some intermediate view between two views. For example, she may allow him to see the country wide sales data and his area's sales data, but not the regional sales data.

Figure 4:
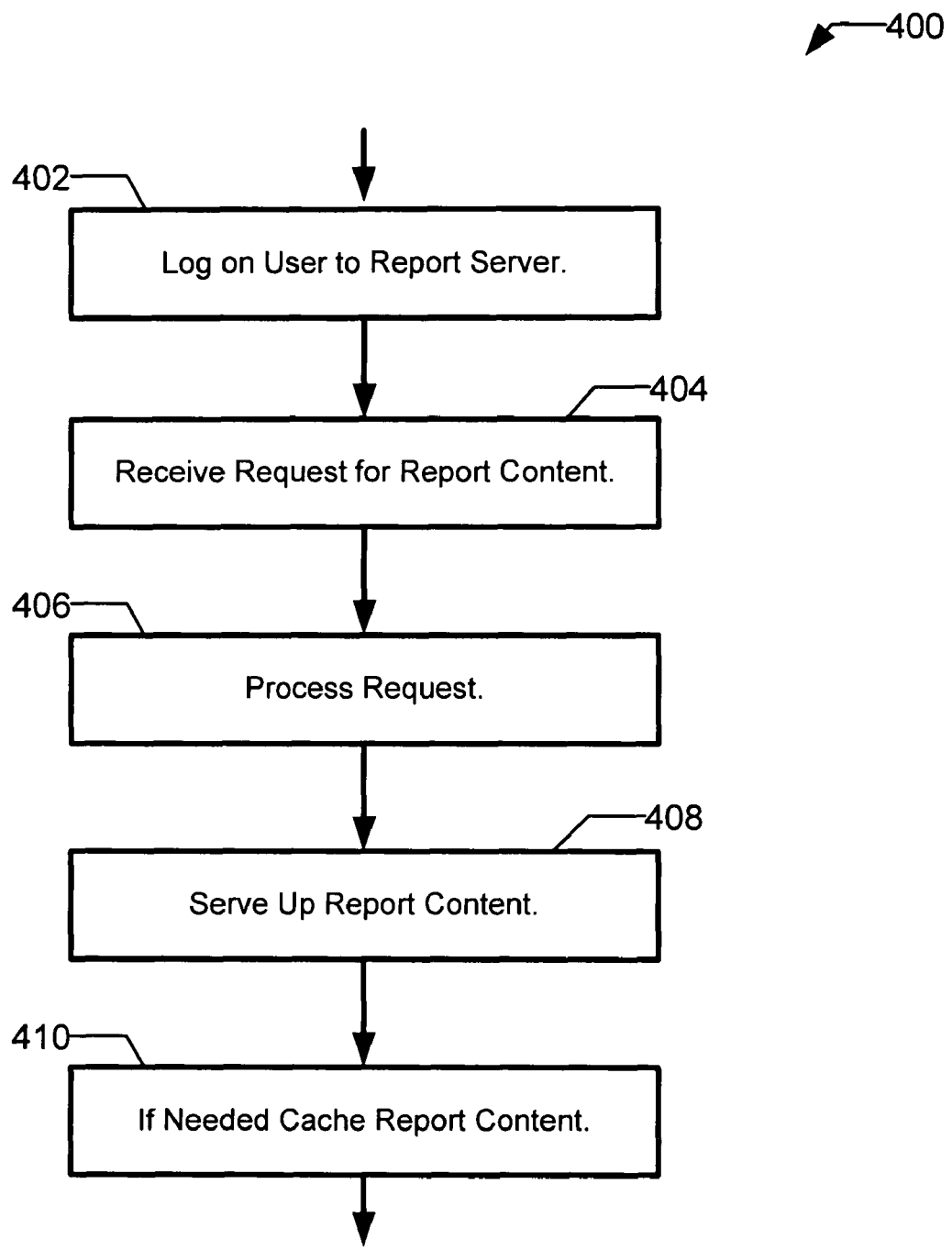
FIG. 4 illustrates a series of processing operations associated with an embodiment of the invention.

FIG. 4 illustrates a series of processing operations associated with an embodiment of the invention. In the first processing operation of FIG. 4, a user logs on to a report server 402. The report server receives a request for report content 404. The server processes the request 406. In the case where the request is for a report, the processing can include retrieving the report from storage or creating the report by accessing data from a datastore, e.g., datastore 240. The data is formatted per the report's schema. In the case where the request is for a portion of a previously generated report, the processing can include retrieving the portion of the report from storage. In some cases the portion of the report is created; the portion of the report could be contained in a generated sub-report. Actions of a user that can lead to a request for report content include, opening a report, paging down/up, drilling down in a report, rolling up in a report (the opposite of drilling down), searching through a report, providing a parameter to a report, refreshing a report, or entering a sub-report.

The processing of the request 406 can include checking the permissions of the users against the permissions needed to view the report or data. In processing operation 408, the server serves up the report content to the users that have requested it or are to receive it by request of another user. In serving up the report contents, the server may elect to transmit to the users only the report content they immediately need. That is, while the full contents of the report may be created, only a subset of the report content is sent to the users for performance reasons. The server can, in optional processing operation 410, cache the report contents it created in the foregoing operations of FIG. 4.

Figure 5:
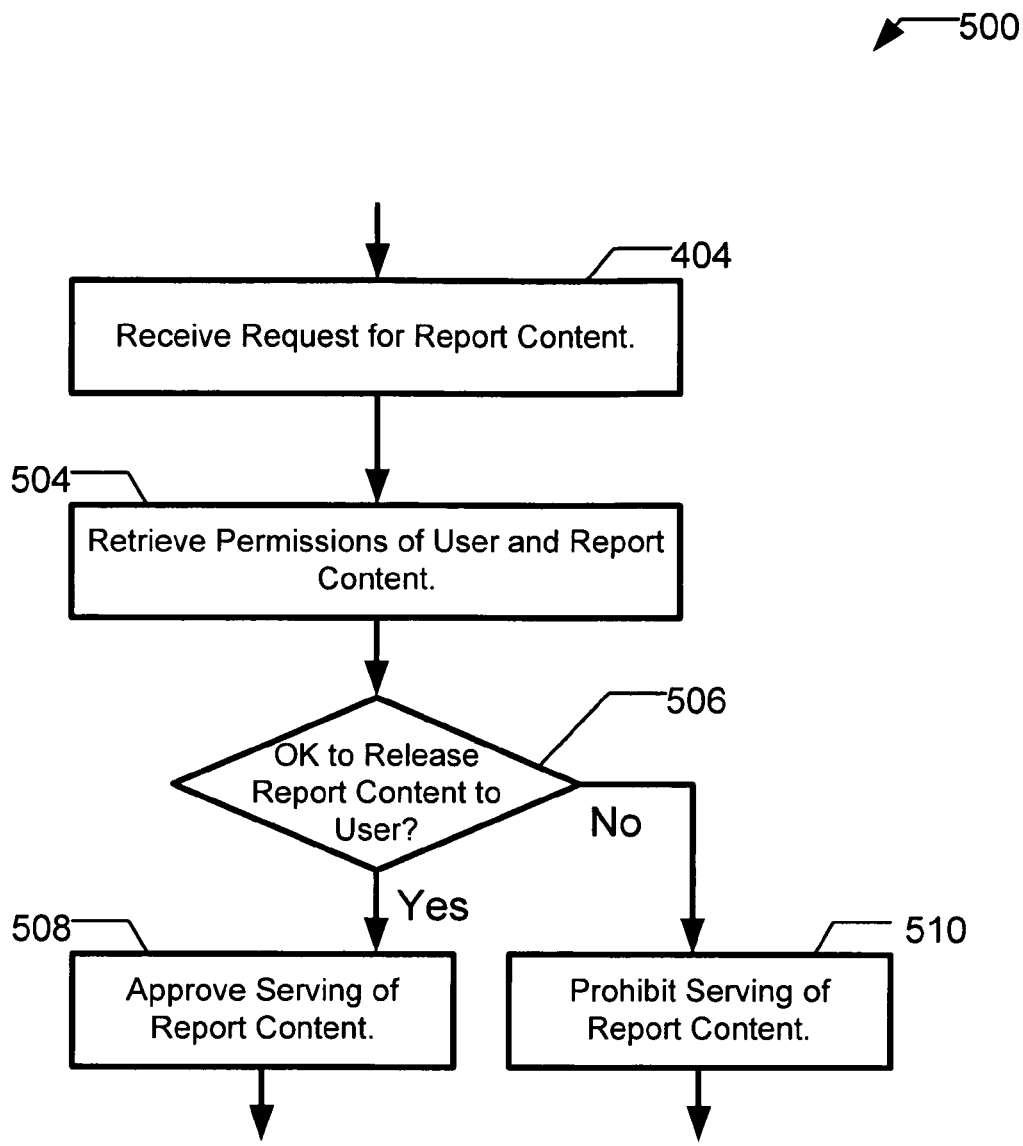
FIG. 5 illustrates a series of processing operations associated with an embodiment of the invention.

FIG. 5 illustrates a series of processing operations associated with an embodiment of the invention. A report server receives a request for report content 404. The report server 220 retrieves the permission of the users and of the report 504. In operation 506 the report server 220 applies instructions from the permissions module 234 to determine if a user can view a report. For example, a set of requests from Alice and Bob may result in a report being provided to Alice but not Bob because of differences in permissions. If Alice has the appropriate permissions, she can share the report with Bob. The server in serving up the report will compare the user's permissions against the report content and route the report accordingly. The report content includes the report and the underlying data. In an embodiment, a user would not be able to circumvent permissions restricting access to data by creating a report that accessed the data. Permissions control access to reports and to data.

If it is acceptable to release report content to a user (506—Yes), the report content is approved for release to the user 508. Otherwise (506—No), the report content is prohibited from release to the user 510. After processing operations 508 and 510, processing continues at operation 408 of FIG. 4.

Figure 6:
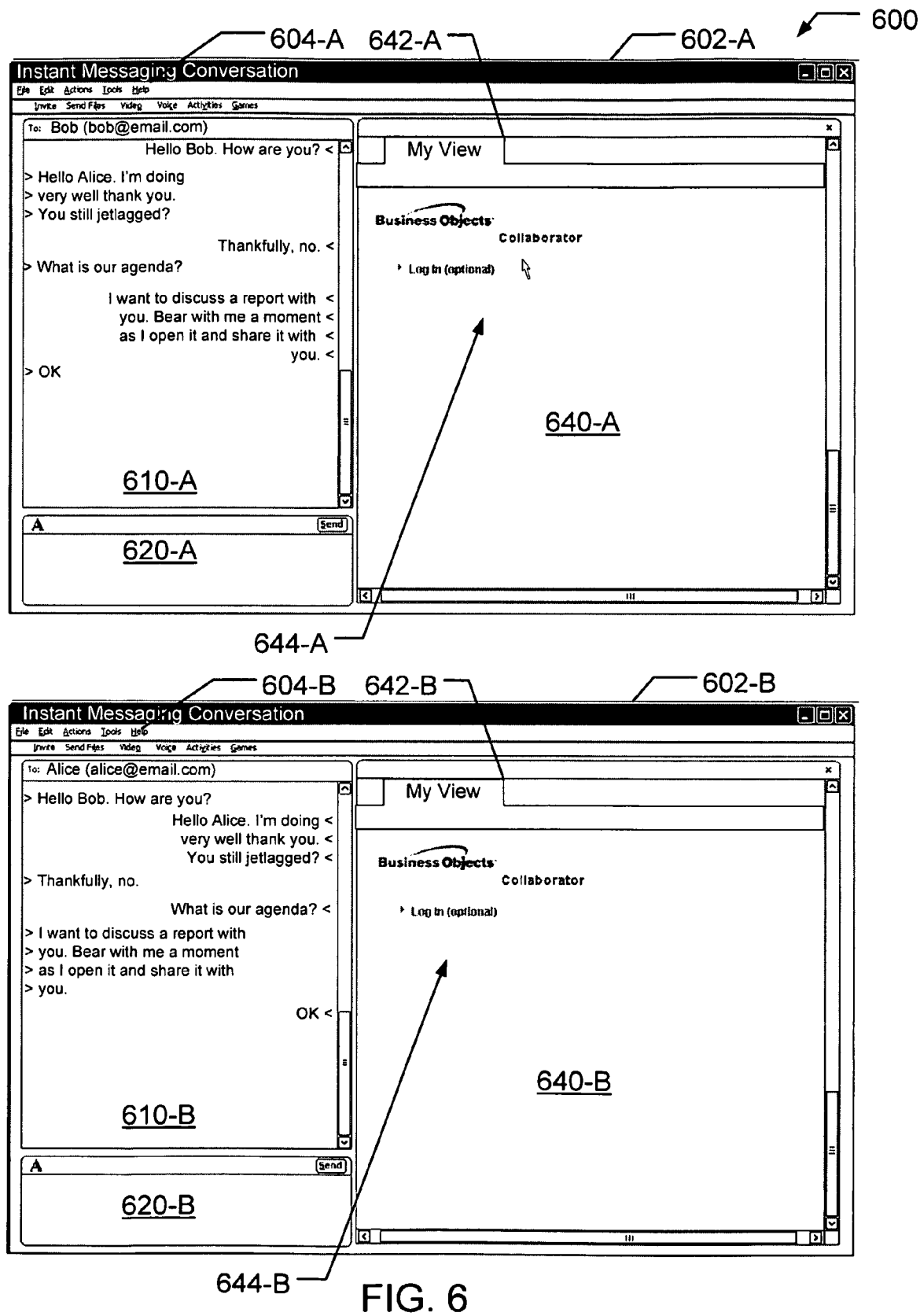
FIG. 6 illustrates two graphical user interfaces (GUIs) that may be utilized in accordance with an embodiment of the invention.

FIG. 6 illustrates two graphical user interface (GUI) 600 windows 602-A and 602-B. Windows 602-A and 602-B belong to Alice and Bob respectively. The GUIs include many standard features. For example, the windows 602-A and 602-B, collectively 602, include a menu bar 604. The windows each include a conversation digest pane 610, i.e., 610-A and 610-B. The second pane in window 602 is an input pane 620, where Alice and Bob enter their text messages for each other.

The GUIs include features configured in accordance with aspects of the invention. The third pane in windows 602 is the report pane 640, where the contents of a report are displayed and interacted with. Also, an interface for logging on to a report server, searching through a report, displaying help information, and the like can be displayed in the report pane 640. The report pane 640 can also contain a non-report document. In an embodiment, the report pane 640 is a workspace for Alice and Bob to share reports and non-report documents. Included in report pane 640 is a set of tabs 642. These tabs include tabs for different views. The set of tabs includes text or icons activating functions associated with report sharing. Also included in report pane 640 is a link 644 to the log in screen for the report server 220.

FIG. 6 also illustrates a workflow associated the invention. An example of the operation 302 of FIG. 3 is shown in FIG. 6. Alice and Bob start an instant messaging conversation. This conversation, Alice: "How are our regional sales doing so far this year?", Bob: "Let's look at the sales report.", et seq., is recorded in the conversation digest pane 610.

Figure 7:
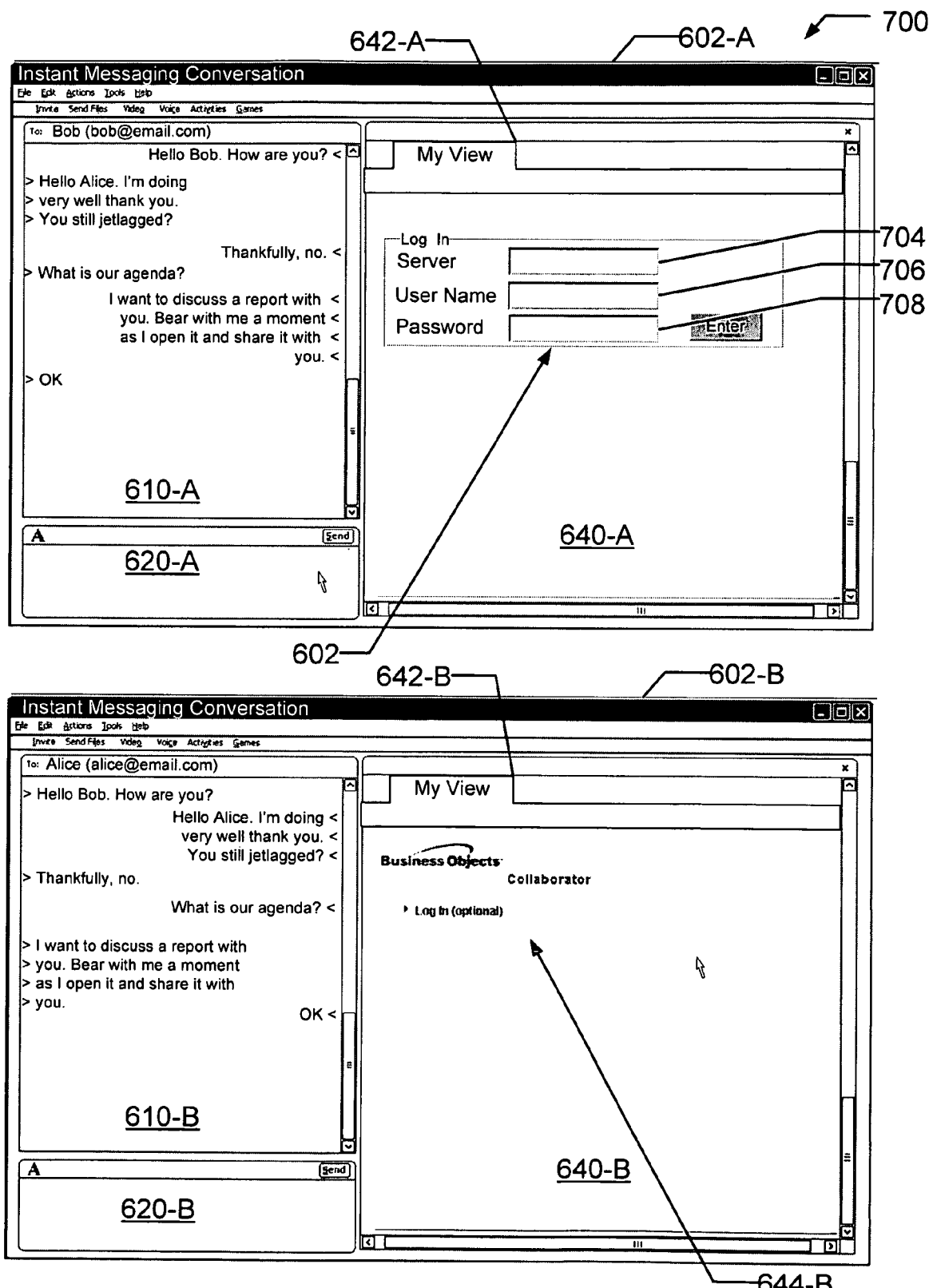
FIG. 7 illustrates a workflow involving the GUIs of FIG. 6.

FIG. 7 illustrates a workflow involving the GUIs of FIG. 6. Alice logs on to the report server 220 via login screen behind link 644. The log in screen 702 to the report server 220 is shown in pane 640. In an embodiment, the report server is specified in box 704. Alice enters her user name and password in boxes 706 and 708. If Alice has provided a correct name and password, Alice is logged into the report server. Bob is not automatically logged in with Alice. Alice can share her view of the report server later.

Figure 8:
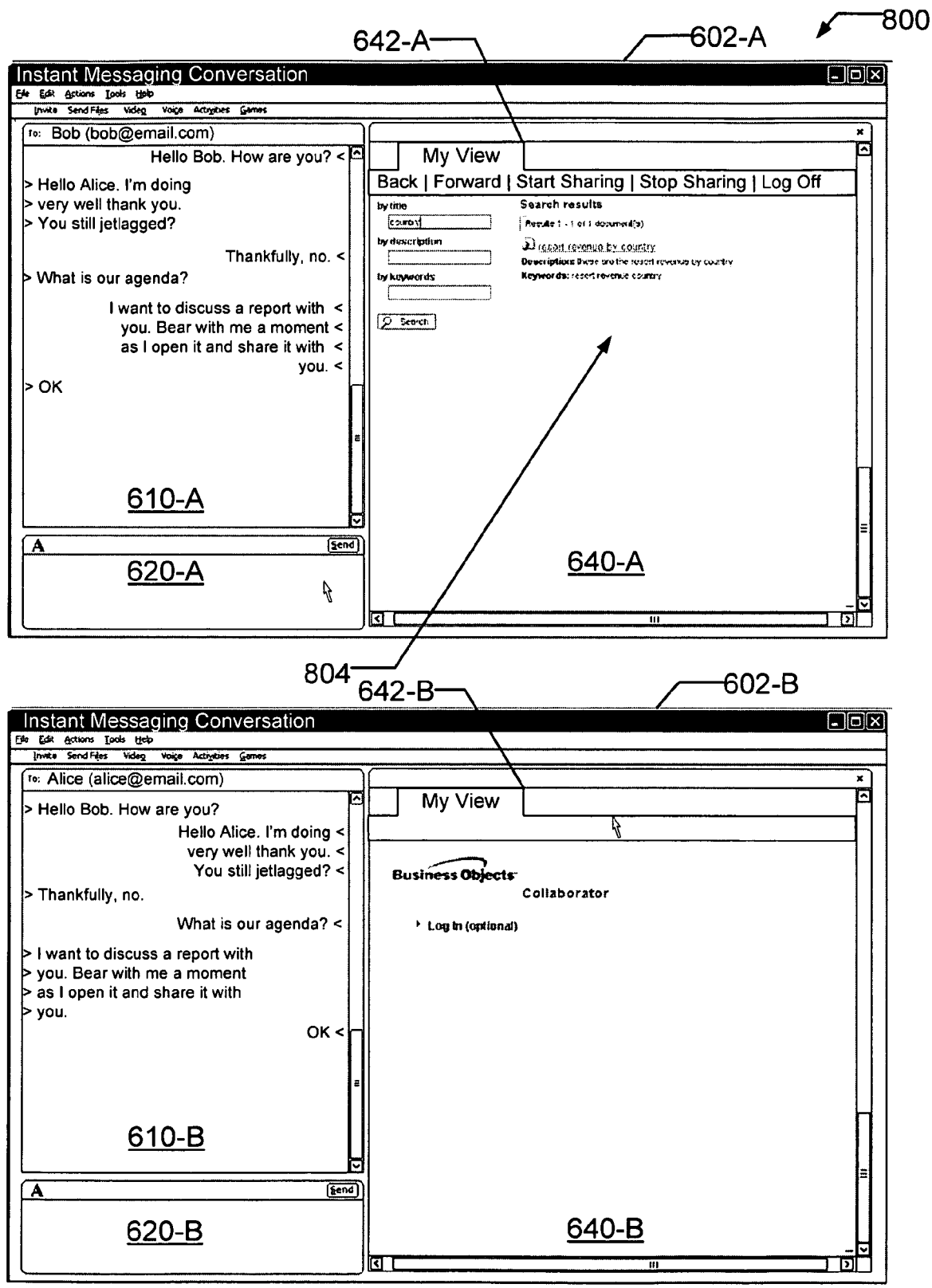
FIG. 8 illustrates a workflow involving the GUIs of FIG. 6.

FIG. 8 illustrates a workflow following the workflow of FIG. 7. Alice has logged in to the report server, such as report server 220 of FIG. 2. She can initiate sharing of her view of the report server with Bob by selecting the "start sharing" tab in the set of tabs 642-A. Because Bob has not been included in Alice's interaction with the report server, his view in report pane 640-B is unchanged. Alice can search for a report via interface 804 in report pane 640-A.

Figure 9:
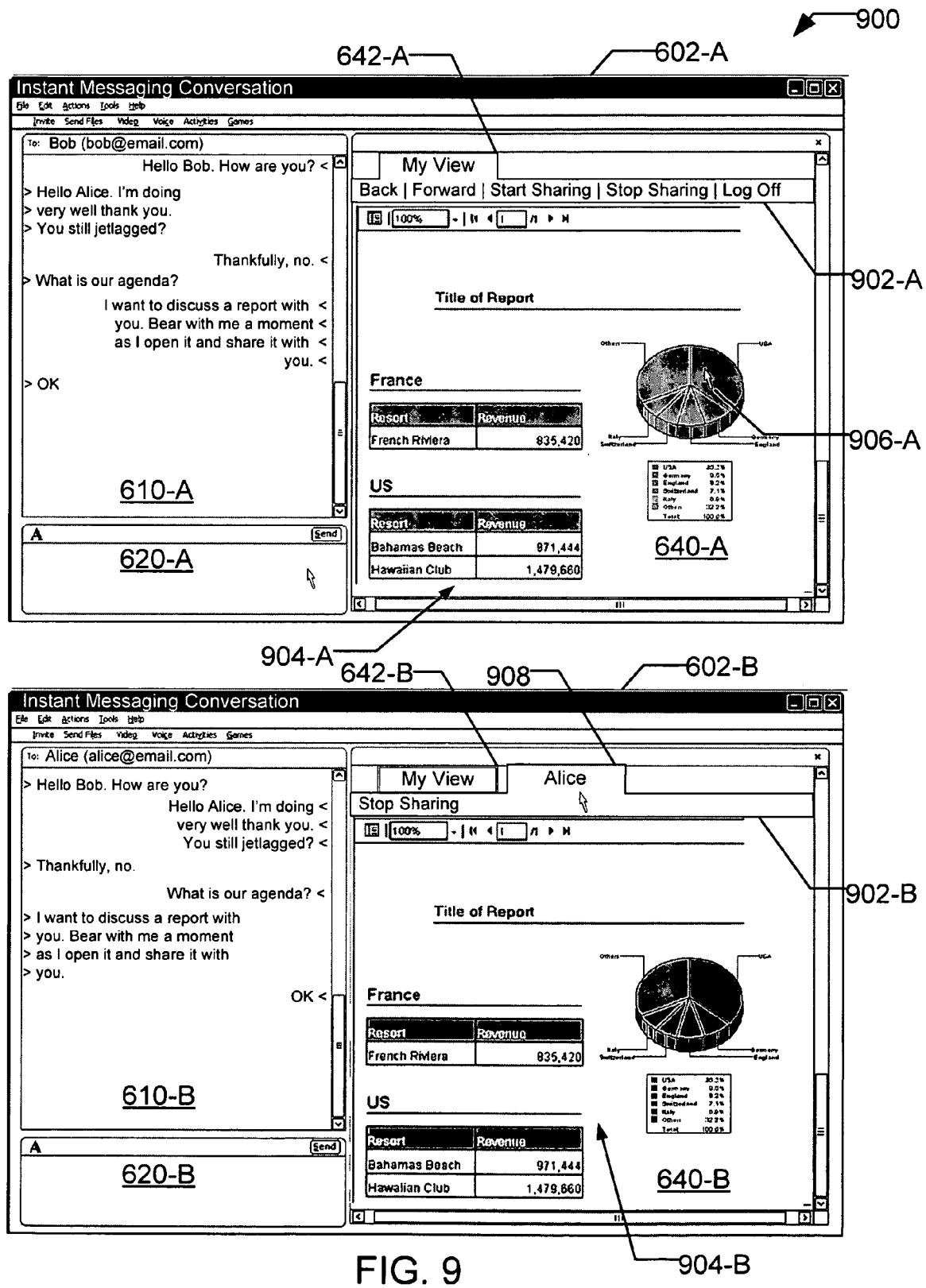
FIG. 9 illustrates a workflow involving the GUIs of FIG. 6.

FIG. 9 illustrates a workflow in which Alice has opened a report and shared it with Bob. Alice's set of tabs 642-A has changed to reflect that she has invited Bob to view the report she opened. The set of tabs 642-A includes a series of functions 902-A including "Stop Sharing" and "Log Off" functions. The report is shown in report pane 640. Bob's view is 904-B and Alice's view is 904-A. Alice's cursor 906-A does not appear in Bob's report pane 640-B.

Bob's view is exposed when he selects the tab 908 marked Alice in his set of tabs 642-B. In an embodiment, Bob sees exactly the same view as Alice. In an embodiment, Bob's baseline permissions are overridden such that he can view the report Alice is sharing with him. In on embodiment, Bob's view of the report is static; he cannot interact with the report.

Figure 10:
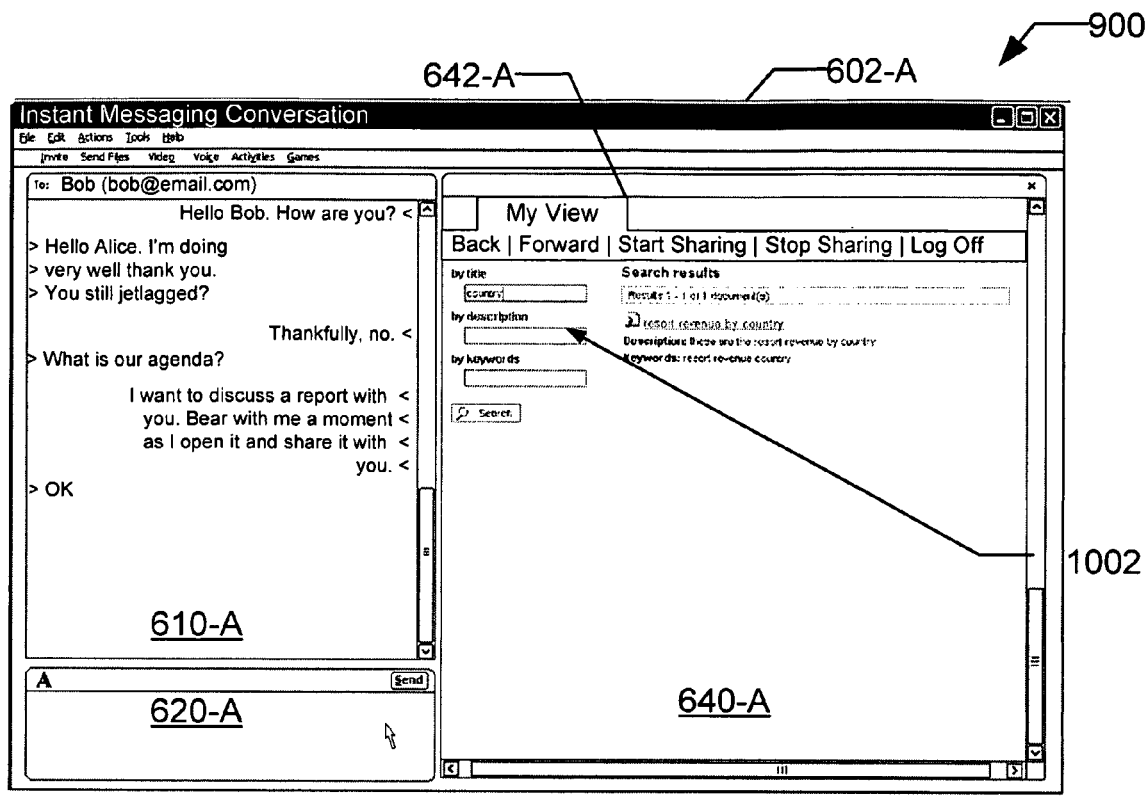
FIG. 10 illustrates a workflow involving the GUIs of FIG. 6.
Figure 10:
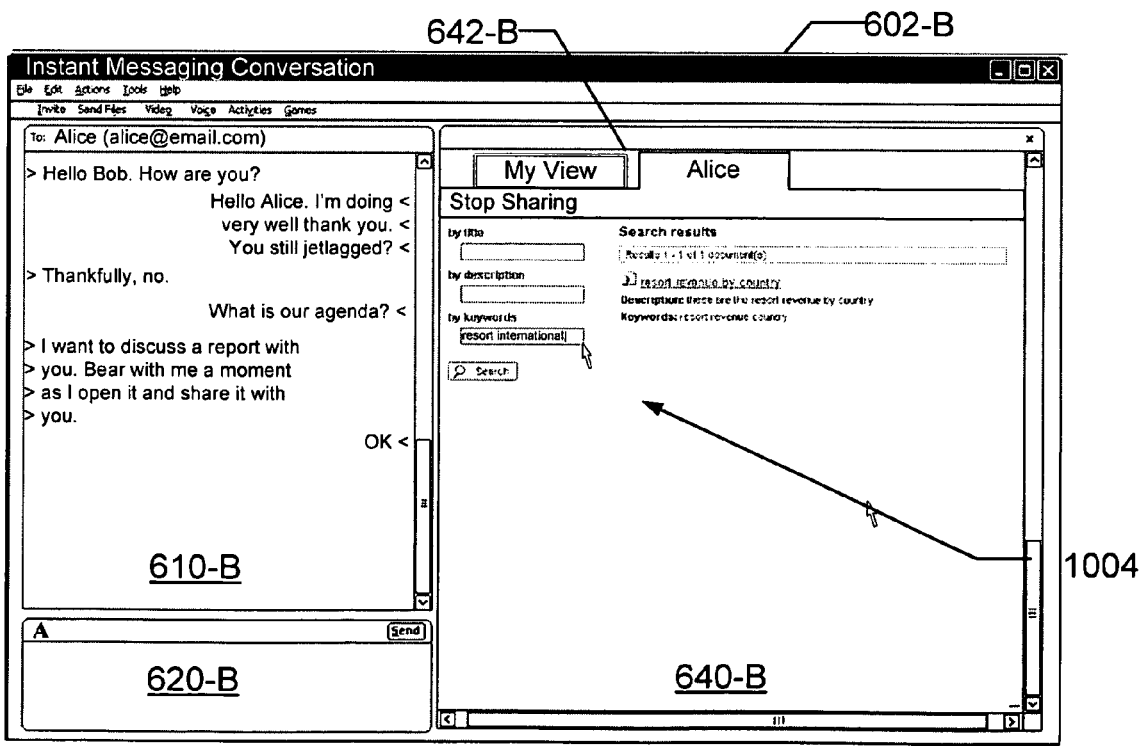

FIG. 10 illustrates a workflow involving the GUIs of FIG. 6. In an embodiment, Bob can interact with the view Alice shares with him. In workflow 1000, Alice and Bob jointly construct a query and run it on the report server. In this example, Alice inserts search terms in block 1002 and Bob inserts search terms in block 1004.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
sending to a report server a first request for report content initiated by a first user, wherein the report server creates a report containing the report content, wherein the report includes information automatically retrieved from a data source, where the information is structured in accordance with a report schema that specifies the form in which the information should be presented;
serving the report content to the first user;
displaying report content to the first user on a first user computer;
sending, from the first user, a second request to the report server to share the report content with a second user;
confirming that the second user has permission to view the report content;
serving the report content to the second user; and
displaying the report content to the second user on a second user computer, wherein displaying on the first user computer includes simultaneously displaying the report content and an instant messaging conversation between the first user and the second user, and wherein displaying on the second user computer includes simultaneously displaying the report content and the instant messaging conversation between the first user and the second user.

2. The method of claim 1 further comprising temporarily overriding permission access limitations of the second user.

3. The method of claim 1 further comprising disabling the display of the report content to the second user in response to a command from the first user.

4. The method of claim 3 further comprising:
sending to the report server a third request for an updated view of the report content initiated by the first user;
serving the updated view of the report content to the first user;
displaying the updated view of the report content to the first user;
sending, from the first user, a fourth request to the report server to share the updated view of the report content with the second user;
serving the updated view of the report content to the second user; and
displaying the updated view of the report content to the second user.

5. A computer readable medium storing executable instructions, comprising executable instructions to:
facilitate an instant messaging conversation between a first computer and a second computer on a network;
process a first request for a report specified by a first user of the first computer, wherein the first request is processed by a report server that creates a report comprising information automatically retrieved from a data source, where the information is structured in accordance with a report schema that specifies the form in which the information should be presented;
return a first portion of the report to the first computer;
receive a second request to share the first portion of the report with a second user of the second computer;
confirm that the second user has permission to view the first portion of the report;
serve the first portion of the report to the second computer; and
disable access to the first portion of the report at the second computer in response to a command from the first user.

6. The computer readable medium of claim 5 further comprising executable instructions to allow the first user to grant the second user temporary access to the first portion or the report when the executable instructions to confirm do not grant permission to view the first portion of the report.

7. A computer readable medium storing executable instructions, comprising executable instructions to:
support at a first computer an instant messaging conversation with a second computer;
display report content on the first computer;
initiate a request at the first computer to share the report content with a second computer, wherein the request is serviced by a report server that creates a report containing the report content, wherein the report includes information automatically retrieved from a data source, where the information is structured in accordance with a report schema that specifies the form in which the information should be presented;
initiate at the first computer a command to grant access to the report content at the second computer;
display the report content and the instant messaging conversation at the second computer; and
receive at the report server a query jointly constructed at the first computer and the second computer.

8. The computer readable medium of claim 7 further comprising executable instructions to process a command to disable access to the report content at the second computer.

9. The computer readable medium of claim 7 further comprising executable instructions to facilitate the first user temporarily overriding permission limitations of the second user.

10. The computer readable medium of claim 7 further comprising executable instructions to:
initiate, at the first computer, a second request for updated report content; and
send a copy of the second request via an instant messaging protocol to the second computer.

11. The computer readable medium of claim 10 further comprising executable instructions to:
receive the copy of the second request via an instant messaging protocol; and
send the copy of the second request to a report server.

* * * * *